United States Patent [19]
Ledvina et al.

[11] Patent Number: 4,832,668
[45] Date of Patent: May 23, 1989

[54] POWER TRANSMISSION CHAIN

[75] Inventors: Timothy J. Ledvina, Ithaca; Robert H. Mead, both of Ithaca, N.Y.

[73] Assignee: Borg-Warner Corporation, Chicago, Ill.

[21] Appl. No.: 184,570

[22] Filed: Apr. 21, 1988

Related U.S. Application Data

[63] Continuation of Ser. No. 15,642, Feb. 17, 1987, abandoned, which is a continuation of Ser. No. 867,979, May 29, 1986, abandoned, which is a continuation of Ser. No. 661,545, Oct. 17, 1984, abandoned.

[51] Int. Cl.⁴ .............................................. F16H 7/06
[52] U.S. Cl. ..................................... 474/155; 474/157
[58] Field of Search ................................ 474/152–153, 474/155, 156, 157, 206, 212–217; 59/5, 7, 84, 85, 88

[56] References Cited

U.S. PATENT DOCUMENTS
4,342,560  8/1982  Ledvina et al. ...................... 474/157

FOREIGN PATENT DOCUMENTS
WO82/00866  3/1982  PCT Int'l Appl. ................. 474/157

Primary Examiner—Thuy M. Bui
Attorney, Agent, or Firm—Robert L. Zieg; James J. Jennings; James A. Geppert

[57] ABSTRACT

A chain and sprocket drive in which the chain is constructed of sets of connected links, the links in all sets being constructed to drivingly contact the sprocket teeth with inside flanks only, the links in some sets of links being of a shape which differs from the links in other sets of links.

16 Claims, 3 Drawing Sheets

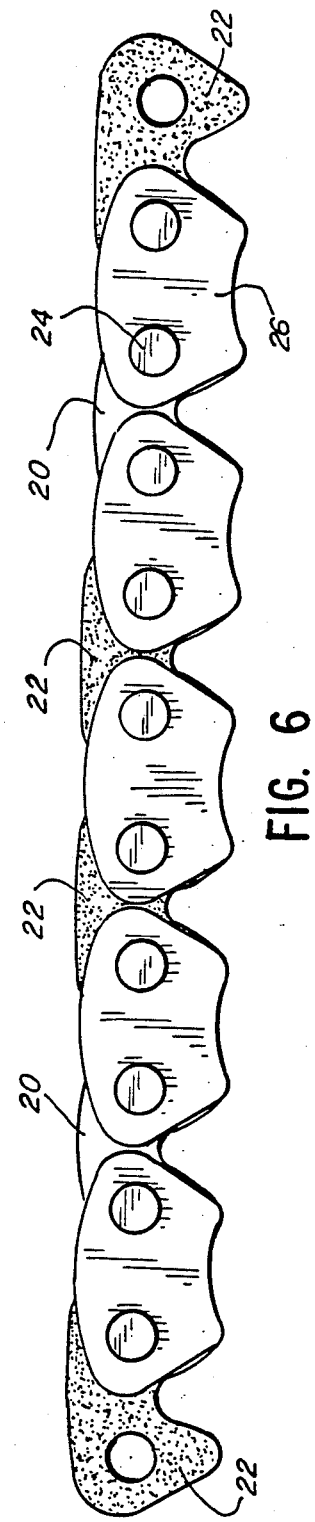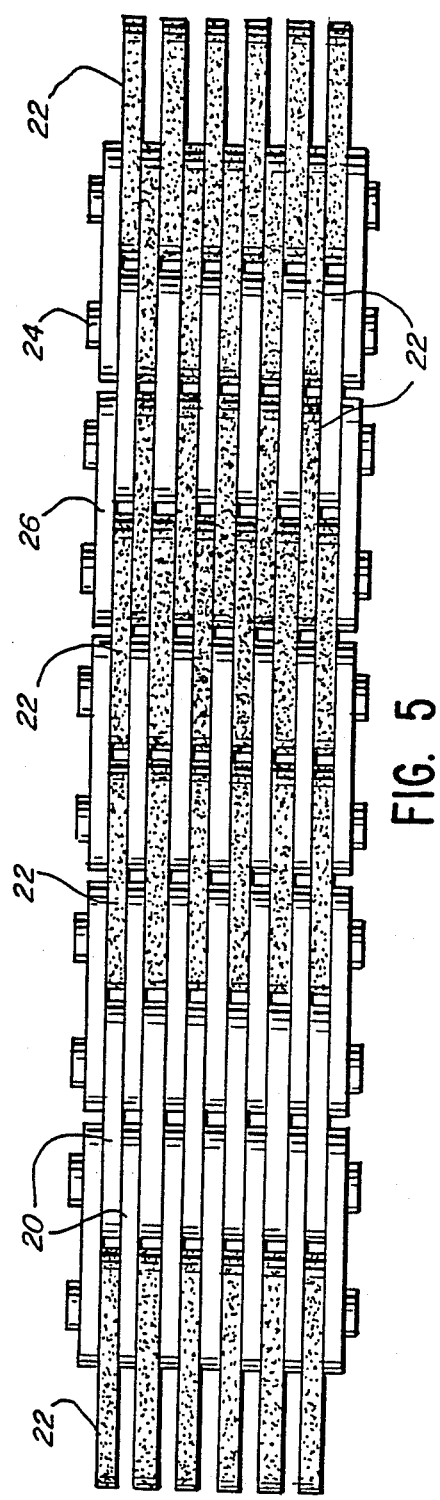

POWER TRANSMISSION CHAIN

RELATED APPLICATIONS

This application is a continuation of the application with the same title and inventorship filed Feb. 17, 1987, Ser. No. 15,642 (now abandoned), which was a continuation of the application with the same title and inventorship filed May 29, 1986, Ser. No. 867,979 (now abandoned), which in turn was a continuation of the parent application with the same title and inventorship filed Oct. 17, 1984, Ser. No. 661,545 (now abandoned).

BACKGROUND OF THE INVENTION

Power transmission chains are widely used in the automotive industry not only for ignition timing but also for transferring power to the driving wheels of a vehicle especially in a front wheel drive automobile. Power transmission chains are also widely used for industrial applications. One type of chain so used is referred to as a "silent chain" in which the chain links are formed with a pair of toes separated by a crotch, each toe being defined by an outside flank and an inside flank, the latter being joined by the crotch. In most, if not practically all modern silent chains, all links, which are arranged in transverse sets joined together by pivot means, are the same. These chains are adapted to be used with toothed sprockets in the power transmission assembly or arrangement. Historically, the outside flank or flanks of industrial power transmission chains drivingly engaged the sprockets while the inside flank or flanks of automotive timing or motion transferring chains engaged the sprockets. Great care was taken in avoiding the mixing of the two types of links in chain assembly plants manufacturing both types of links.

However, it was found that a mixture of the two general types of links provided a chain that generated less noise when used in automotive applications than did some chains constructed of only one type of link or substantially no more noise than prior chains of special construction. The chains incorporating a mixture of the two general types of links have been found to be more durable than the prior chains of special construction. A chain containing a mixture of the two general types of links can be assembled in various patterns and is described and claimed in U.S. Pat. No. 4,342,560, granted to applicants herein on Aug. 3, 1982. The chain so described and claimed in this patent has enjoyed great commercial success.

SUMMARY OF THE INVENTION

The invention herein described relates to power transmission chains of the "silent" chain type which is relatively quiet in operation and which uses a mixture of two varieties of the inside flank contacting link. As such, a chain according to this invention comprises an endless chain constructed of a plurality of metal links arranged as transverse sets, one set being interleaved or laced with the next set of links, the sets being joined by a pivot means, for example, a round pin or other type of joint, such as a pin and rocker. Various joints are well known in the art and need no further identification. As a preferred embodiment, the sets of links are arranged in a more or less random pattern which can be determined, as for example, by the use of a calculator or the like. All links in a set are the same. Also, the chain may include guide links to guide the chain on the sprockets of the transmission. These are well known in the art and do not drivingly engage the sprocket teeth.

Each link of each set of links in the chain of this invention is defined by a pair of spaced toes, each toe of which is defined by an inside and an outside flank, with the inside flanks being joined by or at the crotch. Each link drivingly engages a sprocket with at least one of its inside flanks only. It should be noted that after the links articulate to the chordal position on the sprocket, engagement may occur along the outside flanks to maintain the pins and links in their radial position. However, it is during the transition from the straight line position as the links approach the sprocket along the tangent line to the full chordal position that the inside flanks of the links and only the inside flank of the links drivingly engage the sprocket teeth and articulation of the chain links first occurs. Outside flank engagement, as described, is incidental and is not a driving engagement of the links with the sprocket teeth.

Each inside flank of each link is defined by a convex curve. In the preferred embodiment the inside flank of each link is defined by a curve having the same radius with the curve of some sets of links being struck from a first predetermined center and the curve for other sets of links being struck from a second and different predetermined center. One of the effects of this is that the toes of some links are spread or spaced apart a greater distance than those of other links. However, the links are also so shaped that the pitch for all links is the same and a major portion of the outside flanks of all links are substantially identical.

It is also possible to construct the links of some sets of links with inside flanks of a first radius and those of other sets of links defined by a second and different radius, each radius being struck from the same centers or different centers.

When a chain according to this invention is used in a sprocket transmission, the noise pattern generated by the interaction of the links and the sprocket teeth is modified when compared with the noise pattern generated by a chain and a sprocket wherein all links are identical. The chain as thus described is suitable for use with a variety of sprocket tooth forms including sprockets in which the profile of the teeth is defined by an involute.

BRIEF DESCRIPTION OF THE DRAWINGS

FIG. 5 is a plan view of a segment of a chain constructed according to this invention; and FIG. 6 is a side view of the segment of chain illustrated in FIG. 5;

DESCRIPTION OF THE PREFERRED EMBODIMENT

Figure 1:
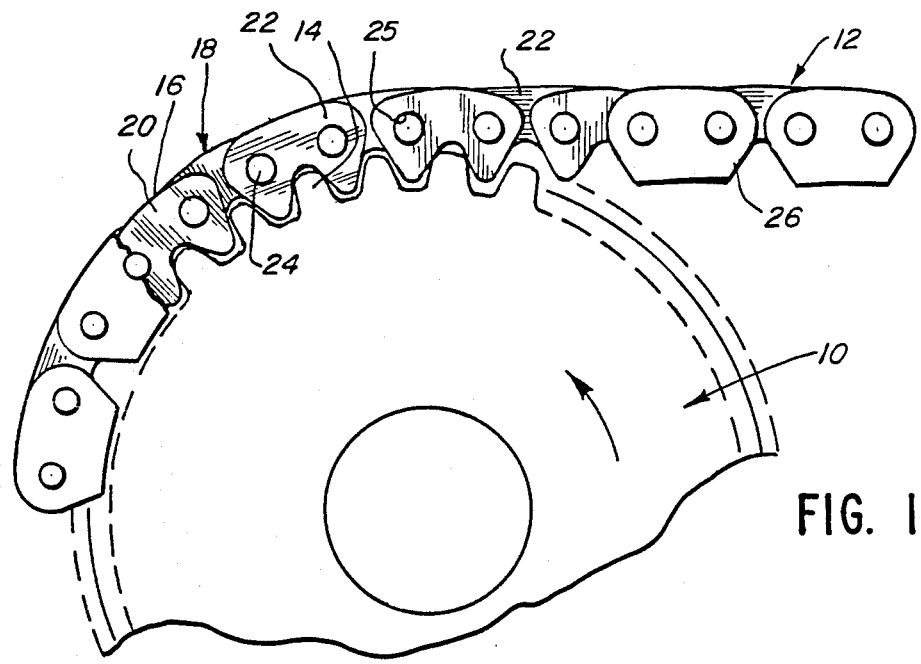
FIG. 1 is a side view of a portion of a sprocket and a segment of a chain constructed according to this invention, with portions broken away.

FIG. 1 illustrates a portion of a sprocket-drive chain combination comprising a sprocket 10 and a chain 12, the sprocket 10 having a plurality of spaced teeth 14, it being understood that a complete drive system includes at least a pair of sprockets which may be of different diameters and thus each having a different number of teeth. The spacing of the teeth on the sprockets is generally the same. The chain 12 is constructed of joined sets 16 and 18 of links 20 and 22. The adjacent sets of links are joined by pivot means 24, illustrated as round pins, the pivot means being received in aligned sets of apertures 25. Alternate sets of links differ in the number of links. Guide links 26 are provided which are used to maintain the lateral alignment of a chain on the sprockets. The guide links illustrated are of the outside variety and have no driving engagement with the sprocket teeth. An inside guide link (not shown, but known in the art) may be used in which case the sprocket is grooved to receive the guide links. The pivot means 24 are usually peened over to maintain the integrity of the chain assembly; however, other methods may be used if desirable.

As stated before, each link in a set is the same; links 20 are used in sets 16 and links 22 are used in sets 18. Both links 20 and 22 are so constructed to drivingly contact the sprocket teeth 14 with their inside flanks only.

Figure 2:
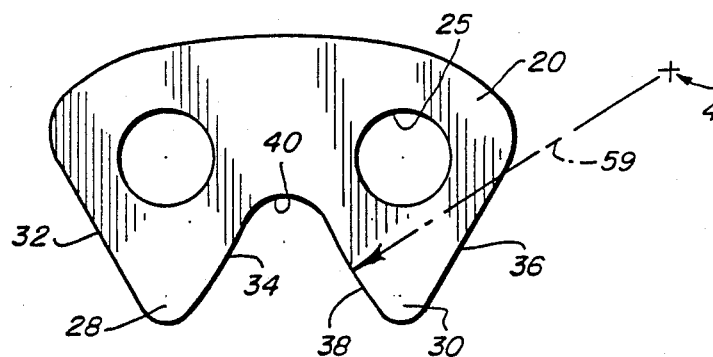
FIGS. 2 and 3 are plan views of the preferred embodiment of two link forms used in the chain segment of FIG. 1.
Figure 3:
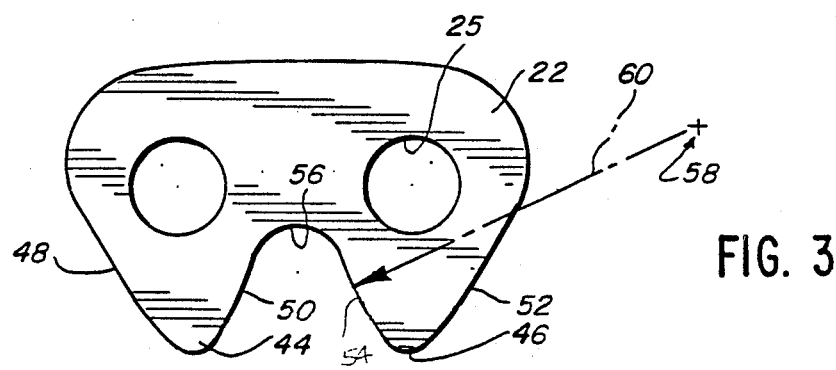
Figure 4:
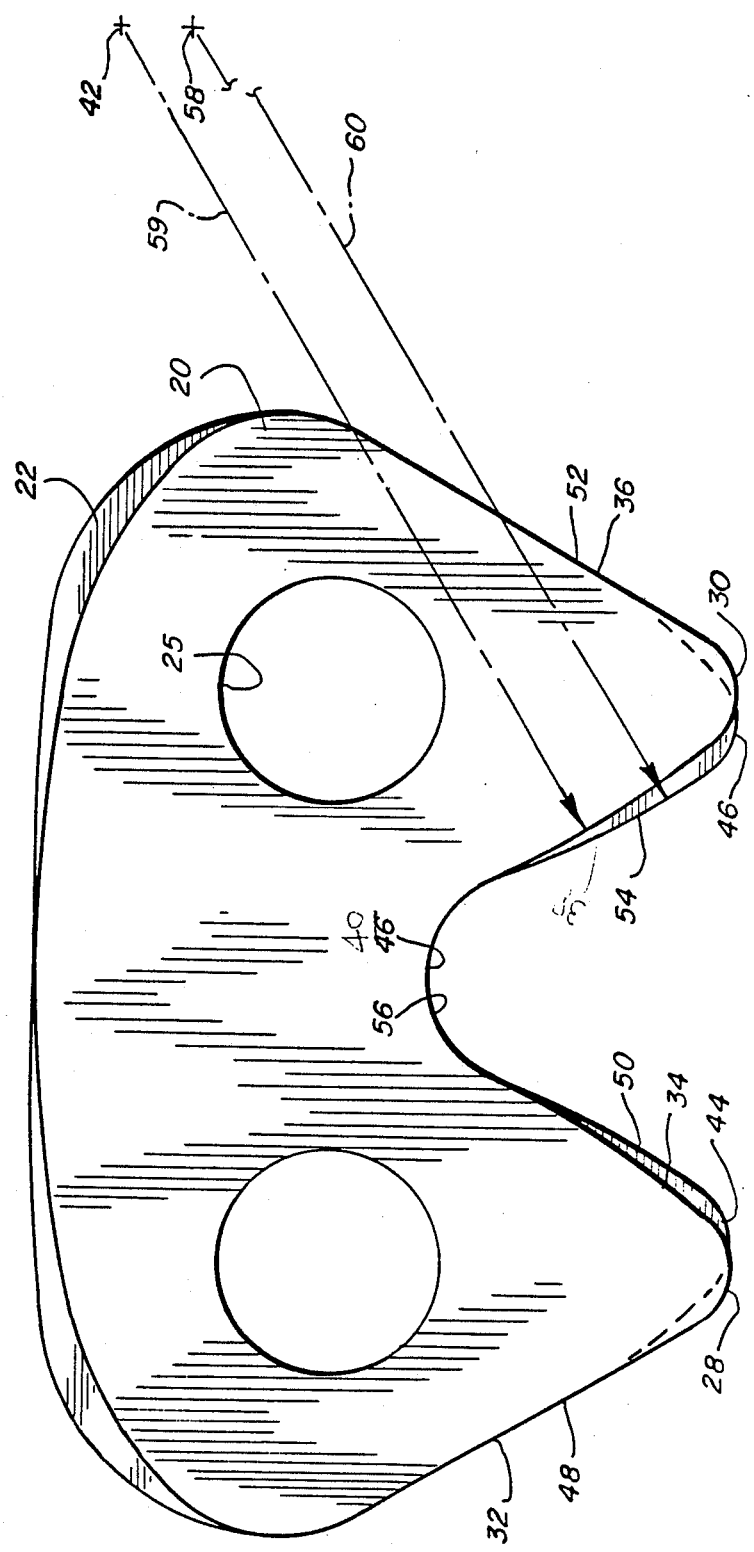
FIG. 4 is a plan view of the links of FIGS. 2 and 3 with one link superimposed on the other to illustrate the differences therebetween and showing the centers of the radii of the inside flanks.

Link 20 is illustrated in FIGS. 2 and 4 and is defined by a pair of spaced toes 28 and 30, toe 28 being defined by an outside flank 32 and an inside flank 34 while toe 30 is defined by an outside flank 36 and an inside flank 38. A crotch 40 joins the inside flanks 34 and 38. The inside flanks 34 and 38 are each convexly curved, the center of curvature of one inside flank being designated by the reference character 42, see especially FIG. 2. The other inside flank is similarly defined. Link 22 is illustrated in FIGS. 3 and 4, and is defined by a pair of spaced toes 44 and 46, toe 44 being defined by an outside flank 48 and an inside flank 50 while toe 46 is defined by an outside flank 52 and an inside flank 54. A crotch 56 joins the inside flanks 50 and 54. The inside flanks 50 and 54 are each convexly curved, the center of curvature of one inside flank being designated by the reference character 58, see especially FIG. 3. The other inside flank is similarly defined. While the radius 59 for the inside flanks 34 and 38 and the radius 60 for the inside flanks 50 and 54 are the same, the centers of curvature 42 and 58 are at different locations relative to the links, and thus the toes 28 and 30 of link 20 are spaced apart a different distance than the toes 44 and 46 of link 22. When viewing the links 20 and 22 as in FIG. 4, it is observed that the pitch (the distance between aperture centers) is the same for both link forms and for the major part, the outside flanks 32 and 36 of link 20 coincide with the outside flanks 48 and 52, respectively, of link 22.

The sets of links can be assembled in many patterns and generally in a random pattern which can be generated by a hand held calculator or by more sophisticated means, such as a computer. A segment of one such chain is illustrated in FIGS. 5 and 6; the same reference characters previously used herein refer to like parts. Links 22 are stippled to distinguish from links 20.

One arrangement of links (identified by the reference characters used herein) by sets in an 84 pitch chain, i.e., 84 sets of links, as follows:

| Set No. | Link Form |
| --- | --- |
| 1 | 20 |
| 2 | 20 |
| 3 | 22 |
| 4 | 22 |
| 5 | 22 |
| 6 | 20 |
| 7 | 20 |
| 8 | 22 |
| 9 | 20 |
| 10 | 20 |
| 11 | 22 |
| 12 | 22 |
| 13 | 20 |
| 14 | 20 |
| 15 | 22 |
| 16 | 20 |
| 17 | 20 |
| 18 | 22 |
| 19 | 20 |
| 20 | 22 |
| 21 | 20 |
| 22 | 20 |
| 23 | 22 |
| 24 | 20 |
| 25 | 20 |
| 26 | 22 |
| 27 | 22 |
| 28 | 22 |
| 29 | 22 |
| 30 | 22 |
| 31 | 20 |
| 32 | 20 |
| 33 | 20 |
| 34 | 22 |
| 35 | 22 |
| 36 | 20 |
| 37 | 22 |
| 38 | 22 |
| 39 | 20 |
| 40 | 20 |
| 41 | 20 |
| 42 | 20 |
| 43 | 22 |
| 44 | 20 |
| 45 | 22 |
| 46 | 22 |
| 47 | 20 |
| 48 | 20 |
| 49 | 20 |
| 50 | 20 |
| 51 | 22 |
| 52 | 22 |
| 53 | 22 |
| 54 | 20 |
| 55 | 22 |
| 56 | 22 |
| 57 | 22 |
| 58 | 22 |
| 59 | 20 |
| 60 | 22 |
| 61 | 20 |
| 62 | 20 |
| 63 | 22 |
| 64 | 20 |
| 65 | 20 |
| 66 | 20 |
| 67 | 20 |
| 68 | 20 |
| 69 | 22 |
| 70 | 20 |
| 71 | 20 |
| 72 | 22 |
| 73 | 22 |
| 74 | 20 |
| 75 | 20 |
| 76 | 20 |
| 77 | 22 |
| 78 | 22 |
| 79 | 22 |
| 80 | 22 |
| 81 | 20 |
| 82 | 20 |
| 83 | 22 |

-continued

| Set No. | Link Form |
|---------|-----------|
| 84 | 22 |

It is believed that most similar random arrangements will result in chains having substantially the same performance as regards to noise generated.

The chains of this invention are compatible with standard involute sprocket teeth or with other profiles of sprocket teeth known in the art. Modified sprockets such as those disclosed by in U.S. Pat. Nos. 3,377,875, 3,495,468 and 4,168,634 can also be used with the chain of this invention.

In subjective testing, a chain constructed in accordance with the preferred embodiment of this invention and tested in an automobile on conventional sprockets produced results which would be generally acceptable by a trained and experienced observer. It is to be understood, however, that subjective ratings as noted vary from person to person, vary depending upon the sprockets used, vary due to transfer case construction and other differences in automobiles, vary due to road and weather conditions, and vary according to drive ratio. There may also be other factors which can introduce differences in the noise evaluation of chain and sprocket drives.

Noise evaluations can be made using the following rating system which is generally self-explanatory.

| | VEHICLE EVALUATION RATING SYSTEM | | | | | | | | |
|---|---|---|---|---|---|---|---|---|---|
| | UNACCEPTABLE | | | BORDER LINE ACCEPTABLE | | ACCEPTABLE | | | |
| RATING INDEX | 1 | 2 3 | 4 | 5 | 6 | 7 | 8 | 9 | 10 |
| EVALUATION OF ANY PARTICULAR VEHICLE COMPONENT PERFORMANCE | POOR | | CUSTOMER COMPLAINT | BORDER LINE | BARELY ACCEPTABLE | FAIR | GOOD | VERY GOOD | EXCELLENT |
| NOISE, VIBRATION, HARSHNESS, SHAKE ETC | NOT ACCEPTABLE | | OBJECTIONABLE | REQUIRES IMPROVEMENT | MEDIUM | LIGHT | VERY LIGHT | TRACE | NOT NOTICEABLE |
| CONDITION NOTED BY | ALL CUSTOMERS | | AVERAGE CUSTOMER | CRITICAL CUSTOMER | | | TRAINED OBSERVER | | NOT PERCEPTIBLE |
| PROCEDURE | REQUIRES ACTION | | | INVESTIGATION REQUIRED | | ACCEPT | | | CHECK RESULTS |

Chains made according to the preferred embodiment of this invention with a round pin as the pivot member have been tested as follows:

1. in a Chevrolet Citation, V-6 engine, sunny day at 60° F., standard involute sprockets and a random set pattern, resulting in an overall noise index rating of 6.5. This rating was calculated by averaging the indexes in 1st, 2nd and 3rd gear drive ranges of 6, 6.5, 6.5, respectively and the index in 2nd gear coast range of 7.

2. in the same automobile, same sprockets but the chain having a lacing of 2 rows of one type of link alternating with 2 rows of the other type of link, windy day at 60° F. resulting in an overall noise index rating of 5. This rating was calculated by averaging the indexes of 1st, 2nd and 3rd gear drive ranges of 5, 5 and 5.5, respectively, and in 2nd and 3rd gear coast ranges of 6.5 and 6.5, respectively.

3. in an Oldsmobile Omega, 4 cylinder engine, cloudy day at 35° F., standard involute sprockets, and a random set pattern, resulting in an overall noise index rating of 5.5. This rating was calculated by averaging the indexes in 1st, 2nd and 3rd gear drive ranges of 5.5, 5 and 5.5, respectively, and in 2nd and 3rd gear coast ranges of 6 and 6, respectively.

A standard OEM chain in the same vehicles was rated about 6.5. The standard chain comprised a plurality of link sets pivotally connected by a pin and rocker joint of a type claimed in Jeffrey U.S. Pat. No. 4,010,656. The chain of this invention is less expensive to make than the pin and rocker joint OEM chain, as described, and possesses sufficient strength and durability for its intended purpose.

It is also possible to construct a chain with some sets of links having inside flanks defined by a first radius and other sets of links having inside flanks defined by a second and different radius, both radii being struck from a common center or different centers. As such, the time interval of driving contact between the links' inside flanks and the sprocket teeth will differ for the two types of links and the noise pattern will be modified from that of the chain constructed of only one type of link.

The appended claims are intended to cover all reasonable equivalents of the subject matter.

We claim:

1. A power transmission chain and sprocket drive comprising a toothed sprocket and a chain composed of a plurality of sets of links with pivot means joining successive sets of links to permit articulation of one set of links relative to an adjacent set of links, each of said links being defined by a pair of spaced toes each formed by a pair of diverging flanks, each pair of diverging flanks comprising an outside flank and an inside flank, the inside flanks of the toes of each link being joined by a crotch, the improvement comprising that each inside flank is defined by a curve of a predetermined radius with the center of said curve for some sets of links being located differently than that for other sets of links, each link in each set drivingly contacting said sprocket teeth only with their inside flanks whereby the time interval of driving contact with said sprocket teeth for some sets of links is different than that of other sets of links.

2. A power transmission chain and sprocket drive as recited in claim 1 further defined by the toes of the links of some sets of links being more widely separated than the toes of other sets of links.

3. A power transmission chain and sprocket drive as recited in claim 1, in which the outside flanks of all links are essentially straight.

4. A power transmission chain and sprocket drive comprising a toothed sprocket and a chain composed of a plurality of sets of links with pivot means joining successive sets of links to permit articulation of one set of links relative to another set of links, each of said links being defined by a pair of spaced toes each formed by a pair of diverging flanks, the toes of the links in some sets of links being spaced a different distance than the toes of the links in other sets of links, each pair of diverging flanks comprising an outside flank and an inside flank, the inside flank of each link in each set being joined by a crotch and each link in each set drivingly contacting said sprocket teeth with their inside flanks only, whereby the time interval of driving contact with said sprocket teeth for some sets of links is different than that of other sets of links.

5. A power transmission chain and sprocket drive as recited in claim 4, in which the inside flanks of the links in said sets of links are defined by arcuate surfaces.

6. A power transmission chain and sprocket drive as recited in claim 5, in which said arcuate surfaces are convexly curved.

7. A chain adapted for power transmission and comprised of a plurality of sets of links, the successive sets of which are joined by pivot means, the links of each set being defined by a pair of outside flanks and a pair of curved inside flanks, the latter of which are joined by a crotch, each outside flank defining a toe with an inside flank such that each link is defined by spaced toes, the improvement wherein the curves defining the inside flanks have the same radius with the center of curvature of the inside flank curve of some sets of links being different from the center of curvature of the inside flank curve of other sets of links.

8. A chain as recited in claim 7, in which the toes of the links in some sets of links are spaced a different distance than the toes of the links in other sets of links.

9. A chain as recited in claim 7, in which the outside flanks of said links in said sets of links are essentially straight.

10. A chain as recited in claim 7 in which the inside flanks are convexly curved and the outside flanks are essentially straight.

11. A power transmission chain and sprocket drive comprising a toothed sprocket and a chain composed of a plurality of sets of links with pivot means joining successive sets of links to permit articulation of one set of links relative to another set of links, each of said links being defined by a pair of spaced toes each formed by a pair of diverging flanks, each pair of diverging flanks comprising an outside flank and an inside flank, the inside flanks of each link in each set being joined by a crotch and each inside flank being defined by a curve of a predetermined radius, the inside flanks of links in some sets of links by a curve of a first predetermined radius and the inside flanks of links in other sets of links by a curve of a second and different radius, each link in each set drivingly contacting said sprocket teeth with their inside flanks only whereby the time interval of driving contact with said sprocket teeth for some sets of links is different than that of other sets of links.

12. A power transmission chain and sprocket drive as recited in claim 11 in which the centers of said radii are the same.

13. A power transmission chain and sprocket drive as recited in claim 11, in which the centers of said radii are different.

14. A power transmission chain and sprocket drive comprising a toothed sprocket and a chain composed of a plurality of sets of links with pivot means joining successive sets of links to permit articulation of one set of links relative to an adjacent set of links, each of said links being defined by a pair of spaced toes each formed by a pair of diverging flanks, each pair of diverging flanks comprising an outside flank and an inside flank, the inside flanks of each link in each set being joined by a crotch, the improvement comprising that the inside flanks of some links have a different curvature than that for other links with each link in each set drivingly contacting said sprocket teeth with their inside flanks only, the difference in inside flank shape of links in some sets of links being arranged so that the time interval of driving contact with said sprocket teeth is different than that of other sets of links.

15. A power transmission chain and sprocket drive as recited in claim 14, in which the inside flanks of the links in said sets of links are defined by arcuate surfaces.

16. A power transmission chain and sprocket drive as recited in claim 15, in which said arcuate surfaces are convexly curved.

* * * * *